(12) United States Patent
Faith et al.

(10) Patent No.: US 10,977,641 B2
(45) Date of Patent: Apr. 13, 2021

(54) BINDING PROCESS USING ELECTRONIC TELECOMMUNICATIONS DEVICE

(71) Applicant: Visa International Service Association, San Francisco, CA (US)

(72) Inventors: Patrick L. Faith, Pleasanton, CA (US); Karen Windus, San Francisco, CA (US); Cesar Otero, East Palo Alto, CA (US); Jeffrey Gill, Foster City, CA (US); Maria-Elena Carlson, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 731 days.

(21) Appl. No.: 15/130,799

(22) Filed: Apr. 15, 2016

(65) Prior Publication Data
US 2016/0307183 A1    Oct. 20, 2016

Related U.S. Application Data

(60) Provisional application No. 62/148,624, filed on Apr. 16, 2015.

(51) Int. Cl.
*G06Q 30/00*    (2012.01)
*G06Q 20/32*    (2012.01)
(Continued)

(52) U.S. Cl.
CPC ....... *G06Q 20/3226* (2013.01); *G06Q 20/223* (2013.01); *G06Q 20/325* (2013.01);
(Continued)

(58) Field of Classification Search
CPC ...................................................... G06Q 20/32
(Continued)

(56) References Cited

U.S. PATENT DOCUMENTS 8,452,959 B2 * 5/2013 Brown ............... H04L 63/0807
                                                    713/168
2011/0238573 A1   9/2011 Varadarajan
(Continued)

FOREIGN PATENT DOCUMENTS

WO    2014184771         11/2014
WO    2015011655 A1       1/2015
WO    2015011655 A1      11/2015

OTHER PUBLICATIONS

NPL Search History.*
(Continued)

*Primary Examiner* — John H. Holly
(74) *Attorney, Agent, or Firm* — Kilpatrick Townsend & Stockton LLP

(57) ABSTRACT

A user may utilize an electronic telecommunications device comprising a wireless communications device to bind a first user device and a second user device. The user can insert the first user device into the electronic telecommunications device and enter authentication information. The first user device and the second user device can be bound over a wireless network enabled by the wireless communications device without requiring any sensitive account information to be entered by the user.

17 Claims, 5 Drawing Sheets

(51) Int. Cl.
*G06Q 20/22* (2012.01)
*G06Q 20/36* (2012.01)
*G06Q 20/40* (2012.01)

(52) U.S. Cl.
CPC ..... *G06Q 20/3278* (2013.01); *G06Q 20/3674* (2013.01); *G06Q 20/409* (2013.01)

(58) Field of Classification Search
USPC ....... 705/41, 1.1, 26.35, 26.1; 713/168, 169, 713/170; 726/28
See application file for complete search history.

(56) References Cited

U.S. PATENT DOCUMENTS

| | | | |
|---|---|---|---|
| 2012/0124676 | A1* | 5/2012 | Griffin ................ H04L 63/0815 726/28 |
| 2013/0159154 | A1 | 6/2013 | Purves et al. |
| 2013/0317928 | A1 | 11/2013 | Laracey et al. |
| 2014/0074655 | A1* | 3/2014 | Lim .................... G06Q 20/387 705/26.35 |
| 2015/0046339 | A1 | 2/2015 | Wong et al. |
| 2015/0199671 | A1 | 7/2015 | Bajaj et al. |
| 2016/0027005 | A1 | 1/2016 | Kurian |

OTHER PUBLICATIONS

EP16780936.7, "Extended European Search Report", dated Jan. 3, 2018, 8 pages.
PCT/US2016/027963, "International Search Report and Written Opinion", dated Jun. 30, 2016, 13 pages.

\* cited by examiner

BINDING PROCESS USING ELECTRONIC TELECOMMUNICATIONS DEVICE

CROSS-REFERENCES TO RELATED APPLICATIONS

This application is a non-provisional of and claims the benefit of the filing date of U.S. Provisional Patent Application No. 62/148,624, filed on Apr. 16, 2015, the disclosure of which is herein incorporated by reference in its entirety for all purposes.

BACKGROUND

It is possible for a fraudster to put stolen payment credentials on a mobile device and utilize the device to conduct payments. Additionally, payment credentials can be stolen or obtained when a user enters account information during a transaction such as by entering an account number on a keypad associated with a point of sale device. Current methods to prevent this type of theft and fraud include camera systems or other types of authentication for a user. However, current fraud prevention techniques to protect payment credentials or account information are still limited by a user providing sensitive information into a device. Thus, there is a need for a more secure method to bind a mobile device with an account.

Embodiments of the invention address this and other problems, individually and collectively.

BRIEF SUMMARY

Embodiments of the present invention are directed to systems and methods for conducting a binding process for a first user device and second user device using an electronic telecommunications device that forgoes the need for a user to enter sensitive account information into a device.

Some embodiments of the invention are directed to a method including receiving, by an electronic telecommunications device, a first user device and authentication information from a user. The method may include connecting, by the electronic telecommunications device using a wireless communication device, to a second user device associated with the user. In embodiments, the method may include binding, by the electronic telecommunications device, an account associated with the first user device to a digital wallet on the second user device. In some embodiments, the first user device and the second user device can be bound by an account number or token associated with the account number of the account. The electronic telecommunications device can then send an indication that the binding has been completed to a server computer. In some embodiments, the indication indicates that the binding was conducted at the electronic telecommunications device.

In some embodiments, the electronic telecommunications device can be an automated teller machine, the first user device can be a card, the second user device can be a mobile device, and the server computer can be a payment processor. In some embodiments, the payment processor can be in communication with a token vault and can issue a token to the second user device after the binding has been completed.

In some embodiments, the payment processor issues a token to the second user device after the binding has been completed. In some embodiments, the token vault maintains a mapping of tokens to accounts for one or more users.

In some embodiments, connecting to the second user device associated with the user is based on authenticating the user utilizing the authentication information. In some embodiments, receiving the first user device, by the electronic telecommunications device, occurs using one or more of a magnetic card strip reader, Bluetooth, or Near Field Communication. In some embodiments, connecting to the second device, by the electronic telecommunications device using the wireless communications device, includes establishing a secure communication channel between the electronic telecommunications device and the second user device. The secure communication channel includes a secure sockets layer (SSL) session with a session key.

Embodiments of the invention are further directed to an electronic telecommunications device comprising a processor, a wireless communication device coupled to the processor, and a memory element. The memory element can comprise code, executable by the processor, for implementing any of the methods described herein.

Embodiments of the invention are further directed to a non-transitory computer-readable storage medium storing computer-executable instructions that, when executed by a computer system, configure the computer system to perform operations for implementing any of the methods described herein.

These and other embodiments of the invention are described in further detail below.

DETAILED DESCRIPTION

Figure 1:
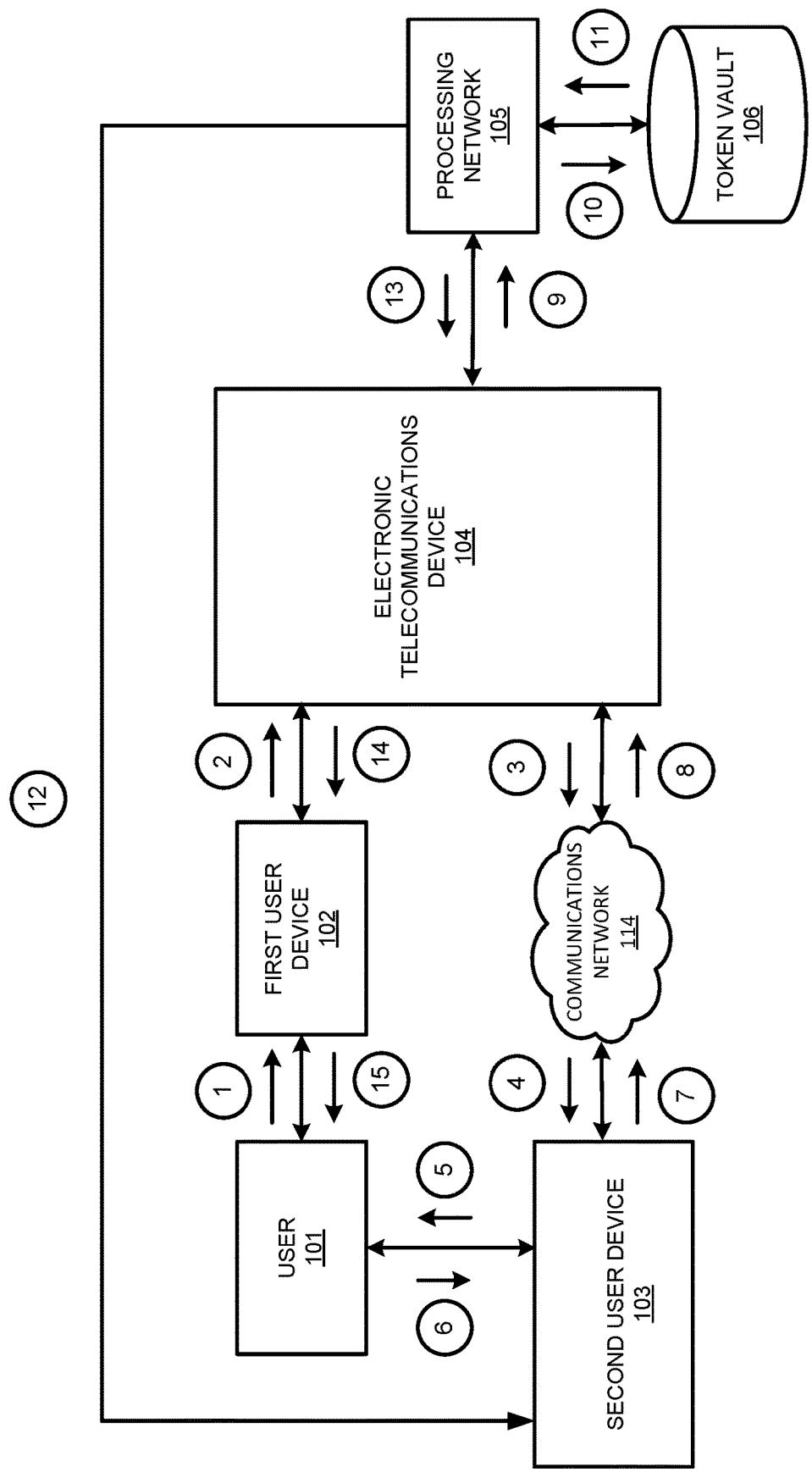
FIG. 1 shows a block diagram of a system and a process flow according to embodiments of the present invention.

Some embodiments of the invention are related to utilizing an electronic telecommunications device comprising a wireless communications device to bind a first user device and a second user device. A user may insert their first user device into the electronic telecommunications device and enter authentication information (e.g., PIN, password, biometric identification, etc.). The electronic telecommunications device may wirelessly connect with a second user device associated with the user. In some cases, the first user device and second user device may be bound by an account number (e.g., PAN) or token associated with the account number corresponding to an account of the first user device. Subsequently, the electronic telecommunications device may send an indication that the binding has been completed to a server computer, such as a payment processor computer. Hence, the first user device and the second user device can be bound over a wireless network without requesting any sensitive account information to be entered by the user. In embodiments, the second user device may be provisioned with a payment token that is associated with the user's account and can be utilized for future transactions or uses.

Embodiments of the invention provide several advantages. For example, a user does not have to enter any sensitive account information into any device during the binding process. The binding process avoids any steps of key-entering or displaying sensitive information, which could more easily compromise information. Further, the authentication processes conducted by an automated teller machine for financial services can be integrated with the binding process in embodiments of the invention. Hence, it can be determined whether a user with a first user device has entered valid authentication information and possesses a second user device (e.g., by personal network connection), which ensures an additional level of security. The invention enables establishment of a hard binding between a second user device and the account of first user device before utilizing resources to issue a token to second user device. Also, implementation of the invention described herein may include monetary advantages as networking capabilities (such as wireless, Bluetooth, or Near Field Communications) of electronic telecommunications devices can be leveraged without purchasing additional infrastructure capabilities.

Embodiments of the invention, as discussed herein, may be described as pertaining to financial transactions and payment systems. However, embodiments of the invention can also be used in other systems. For example, instead of binding a payment account to a second user device, other account information may be bound to the second user device (e.g., information identifying access to a secure area or to secure data). Subsequently, the second user device may be utilized to gain entry to a secure area via an access point, to an event such as a sports game, or to access secure data.

Prior to discussing specific embodiments of the invention, some terms may be described in detail.

A "user" may include an individual. In some embodiments, a user may be associated with a first user device and/or a second user device. The user may be associated with one or more accounts and/or personal accounts. The user may also be referred to as a cardholder, account holder, or consumer.

A "first user device" may be a device operated by a first user. In some embodiments, the first user device may include any suitable device that may be used to conduct a transaction, such as to provide credentials to a resource provider. The first user device may be a software object, a hardware object, or a physical object. As examples of physical objects, the first user device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A first user device may be a payment device that may be associated with a value such as a monetary value, a discount, or store credit. Suitable first user devices can be hand-held and compact so that they can fit into a user's wallet and/or pocket (e.g., pocket-sized). Example first user devices may include smart cards, magnetic stripe cards, keychain devices (such as the Speedpass™ commercially available from Exxon-Mobil Corp.), etc. Other examples of first user devices include pagers, payment cards, security cards, access cards, smart media, transponders, and the like. If the first user device is a payment device that is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

A "second user device" may include any device operated by a first user. In some embodiments, it may be any suitable electronic device that may, or may not, be transported and operated by a user, which may also provide remote communication capabilities to a network. The first user device and second user device may be referred to generically as user devices. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. In embodiments of the invention, second user devices may include their own respective housings, data processors, and memories. A second user device may be configured to run one or more software applications such as mobile applications or a digital wallet application.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more user devices.

An "application" may be computer code or other data stored on a computer readable medium (e.g. memory element or secure element) that may be executable by a processor to complete a task. An application may include a mobile application. An application may be designed to streamline the process for accessing a secure area or secure data. An application may allow the user to load one or more access credentials onto the application so as to enable the user to enter a location or gain access to secure data without having to enter identification information or present a physical card (such as an identification or access card).

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. As described herein, a server computer may authenticate the user or authentication requests may be provided to the authorizing entity for authorization of the user.

A "token vault" may comprise any information related to tokens. For example, a token vault may store tokens associated with users and a mapping of the tokens to their associated payment accounts or devices. A token vault may comprise any sensitive information (e.g., account number) associated with the tokens.

An "electronic telecommunications device" may include any suitable device that can communicate via any suitable type of communications network. In some embodiments, an electronic telecommunications device may enable financial transactions without the need for a human bank teller. In embodiments, the electronic telecommunications device may be an automated teller machine (e.g., EMV enabled terminal, etc.). The electronic telecommunications device may implement a secure cryptoprocessor for implementing crpyotgraphic operations of sensitive information provided by and/or associated with a user. The electronic telecommunications device may include a number of alarms, housing, tamper resistance mechanisms that prevent physical access. Further, the secure cryptoprocessor may be embedded or housed in multiple physical security layers (housing) to prevent tampering. An electronic telecommunications device may implement one or more authentication provisioning mechanisms, such as a key pad for entering a personal identification number or a biometric scanner for processing user provided biometrics (finger prints, iris, facial recognition, etc.,). An electronic telecommunications device may be utilized in other systems for binding other account information to a second user device to allow access to a secure area or secure data.

A "wireless communications device" may include any suitable device that can enable wireless communication according to embodiments of the invention. For example, wireless communications devices may include devices and/or chipsets (e.g., a Bluetooth® device, an 802.11 device, a WiFi device, a WiMax device, cellular communication facilities, etc.) that may enable electronic telecommunications device to communicate between second user device and bind the account of a first user device to a second user device. Examples of a wireless communications device may include a wireless router, Bluetooth access point, Near Field Communications access point, or a cellular communication access point.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

"Binding an account" as used herein may refer to any suitable process for associating a suitable account (including a payment account, a virtual account, etc.,) to a digital wallet or mobile application. The binding processing can enable a streamlined process for purchasing and paying for items or services utilizing the digital wallet or gaining entry/access to an event, area, or data utilizing the second user device that implements the digital wallet or mobile application.

A "token" may be a substitute value for a credential. A token may be a string of numbers, letters, or any other suitable characters. Examples of tokens include payment tokens, access tokens, personal identification tokens, etc.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. For example, memory elements are present in the first and second user devices 102, 103, and the server computer 104, but are not specifically illustrated for clarity of illustration.

FIG. 1 illustrates an exemplary system 100 with at least some of the components for implementing embodiments of the invention. FIG. 1 includes a user 101, a first user device 102, a second user device 103 (both of which may alternatively be referred as first and second devices, respectively), an electronic telecommunications device 104, and a processing network 105 in communication with a token vault 106. Second user device 103 may include a processor and a mobile application. Electronic telecommunications device 104 may include a processor and a wireless communications device.

A user 101 (which may alternatively be referred to as a consumer) may be associated with one or more user devices and may initiate a binding process. In some embodiments, user 101 may utilize first user device 102 (e.g., payment card) for financial transactions. User 101 may also be associated with and in possession of second user device 103 (e.g., mobile device), which may be in close proximity to electronic telecommunications device 104. User 101 may interact with electronic telecommunications device 104, such as by entering authentication information (e.g., PIN, password, biometric identification, etc.), to conduct the binding process. User 101 may interact with one or more of first user device 102, second user device 103, and electronic telecommunications device 104 during the binding process.

First user device 102 may be any suitable device that can be accepted by electronic telecommunications device 104. For example, first user device 102 may be a payment card (e.g., EMV card, magnetic stripe card, etc.) associated with an account of user 101. In some cases, first user device 102 may be inserted into electronic telecommunications device 104, which may read information, such as an account number, from first user device 102.

Second user device 103 may be any suitable device that has wireless communication capabilities and may be capable of conducting any methods described herein. Second user device 103 may include a processor and a mobile application. Second user device 103 may also comprise a memory element comprising information or code for implementing any methods described herein. Second user device 103 may communicate over communications network 114 with electronic telecommunications device 104 for binding first user device 102 and second user device 103.

Some non-limiting examples of second user device 103 may include mobile devices (e.g., cellular phones, keychain devices, personal digital assistants (PDAs), pagers, notebooks, laptops, notepads, smart watches, fitness bands, jewelry, etc.), automobiles with remote communication capabilities, personal computers, and the like.

A processor within second user device 103 may include hardware that carries out instructions embodied as code in a computer-readable medium (e.g., a non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

A mobile application may be any application that user 101 may utilize for financial services. For example, the mobile application may be a payment application installed on second user device 103. The mobile application may comprise a digital wallet that can be bound by an account number or token associated with the account number corresponding to an account associated with first user device 102. In some embodiments, second user device 103 may be provisioned with a token for future use by the mobile application after the binding process. In some cases, user 101 may interact with an interface of the mobile application presented on the second user device 103.

Electronic telecommunications device 104 may be any suitable device having wireless communication capabilities and be capable of conducting any of the methods described herein. Electronic telecommunications device 104 may comprise a processor and wireless communications device. In some embodiments, electronic telecommunications device 104 may be an automated teller machine (e.g., EMV enabled terminal, etc.) that can enable financial transactions without the need for a human bank teller. Electronic telecommunications device 104 may be capable of receiving first user device 102 and detecting information associated with first user device 102. Electronic telecommunications device 104 may also bind the account of first user device 102 and second user device 103 over a wireless network, such as communications network 114. Electronic telecommunications device 104 may also communicate wirelessly with processing network 105.

A processor of an electronic telecommunications device may include hardware that carries out instructions embodied as code in a computer-readable medium (e.g., a non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

A wireless communications device may be any suitable device that can enable wireless communication according to embodiments of the invention. For example, a wireless communications device may be a device and/or chipset (e.g., a Bluetooth® device, an 802.11 device, a WiFi device, a WiMax device, cellular communication facilities, etc.) that may enable electronic telecommunications device 104 to communicate between second user device 103 and bind the account of first user device 102 to second user device 103.

Communications network 114 may comprise a plurality of networks for secure communication of data and information between entities. In some embodiments, communications network 114 may follow a suitable communication protocol to generate one or more secure communication channels for electronic telecommunications device 104 and second user device 103. Any suitable communications protocol may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information related to user 101 may be securely transmitted.

Processing network 105 may include data processing subsystems, networks, and operations used to support and deliver authorization services, and clearing and settlement services. In some cases, payment processing network 105 may be operated by one or more server computers. An example of payment processing network 105 includes VisaNet®, operated by Visa®. Payment processing network 105 may include wired or wireless network, including the internet. In some embodiments, payment processing network 105 may be in communication with token vault 106 that may store an association between a token and an associated account number of user 101 to be utilized for the binding process.

Token vault 106 may comprise any information related to tokens. For example, token vault 106 may store tokens associated with user 101 and a mapping of the tokens to their associated payment accounts or devices. Token vault 106 may comprise any sensitive information (e.g., account number) associated with the tokens. In some embodiments, payment processing network 105 may communicate with token vault 106 to de-tokenize a token. Token vault 106 may de-tokenize the token by determining information associated with the token based on the stored mapping. In some implementations, token vault 106 may reside at payment processing network 105.

A method according to the embodiments of the invention can be described with respect to FIG. 1. FIG. 1 shows a flowchart of a method for conducting a binding process according to embodiments of the present invention.

Additional methods and processes may be included within these methods and may be recognized by one of ordinary skill in the art, in light of the description below. Further, in some embodiments of the present invention, the described methods may be combined, mixed, and matched, as one of ordinary skill would recognize.

At step 1, user 101 may present first user device 102 to electronic telecommunications device 104 to initiate a binding process between an account associated with first user device 102 and second user device 103. In some embodiments, first user device 102 may be a payment card and electronic telecommunications device 104 may be an automated teller machine. First user device 102 may be presented to electronic telecommunications device 104 by any suitable system, such as a card slot, container, or other receptacle. User 101 may also be in possession of second user device 103 in close proximity to electronic telecommunications device 104.

At step 2, electronic telecommunications device 104 may receive first user device 102 and authentication information from user 101. User 101 may insert first user device 102 and enter authentication information (e.g., password, PIN, biometric identifier, etc.) to electronic telecommunications device 104. If the authentication information is valid, user 101 may be authenticated and the binding process may continue. Subsequently, electronic telecommunications device 104 may read relevant information (e.g., an account number) from first user device 102.

At step 3 and 4, electronic telecommunications device 104 may form a wireless connection with second user device 103 utilizing a wireless communications device. For example, electronic telecommunications device 104 may utilize a Bluetooth® device to detect and to form a connection by communications network 114 with second user device 103.

At step 5, second user device 103 may be provided an option to pair the account of first user device 102 to second user device 103. For example, second user device 103 may prompt user 101 to change settings to enable a binding process between first user device 102 and second user device 103. Second user device 103 may be updated to be set to a certain mode (e.g., binding mode, account pairing mode, etc.) in order for the binding process to be conducted. In some embodiments, second user device 103 may display a notification after detecting that electronic telecommunications device 104 is communicating with second user device 103. In other embodiments, user 101 may not be prompted with any notification.

At step 6, user 101 may operate second user device 103 to change its settings to enable the binding process. In some cases, user 101 may interact with an interface displayed on second used device 103. In some embodiments, the interface may be part of a mobile application comprising a digital wallet that is to be paired with the account of first user device 102 by the associated account number.

At step 7 and 8, second user device 103 may communicate to electronic telecommunications device, which may initiate the binding between the account associated with first user device 103 and second user device 103. For example, after user 101 updates settings of second user device 103, second user device 103 may confirm its wireless connection by communications network 114 with electronic telecommunications device 104. In some cases, second user device 103 may also send a confirmation that it is ready for the binding process to electronic telecommunications device 104.

At step 9, electronic telecommunications device 104 may communicate with the processing network 105. Electronic telecommunications device 104 may send the processing network 105 an indication (e.g., message) that the binding process is being conducted utilizing electronic telecommunications device 104, as well as the relevant information (e.g., account number) retrieved earlier from first user device 102. Electronic telecommunications device 104 may also send the processing network 105 a confirmation that second user device 103 was detected using a wireless communications device and that user 101 associated with first user device 102 and second user device 103 was authenticated.

At step 10, the processing network 105 may communicate with token vault 106 to retrieve a token associated with the account number corresponding to first user device 102. For example, the processing network 105 may access a mapping of tokens to account numbers stored by token vault 106.

At step 11, token vault 106 may send the retrieved token associated with the account number of first user device 102 to the processing network 105. The account number may be associated with the payment account associated with first user device 102. Subsequently, the processing network 105 may issue a token associated with the account number of first user device 102 to second user device 103.

At step 12, the token may be provisioned onto second user device 103. In a preferred embodiment, the token may be provisioned over-the-air by the processing network 105 (or an issuer computer). In other embodiments, the token may be provisioned over the connection enabled by a wireless communications device directly from an automated teller machine (e.g., electronic telecommunications device 104) or other local electronic device. User 101 may utilize the provisioned token for financial services conducted with a mobile application comprising a digital wallet on second user device 103. In some embodiments, second user device 103 may be provisioned with any relevant account data.

At step 13, the processing network 105 may send a confirmation to electronic telecommunications device 104 that the binding process has been completed and that a token associated with the account of first user device 102 has been issued to second user device 103. In some cases, a notification may be displayed on a display of electronic telecommunications device 104 indicating this information.

At step 14, electronic telecommunications device 104 may return first user device 102 to user 101. In some embodiments, electronic telecommunications device 104 may eject first user device 102.

At step 15, user 101 may retrieve first user device 102. User 101 may utilize first user device 102 and second user device 103 for financial services, where the devices are bound by the token associated with the account number corresponding to the payment account of first user device 102.

Figure 2:
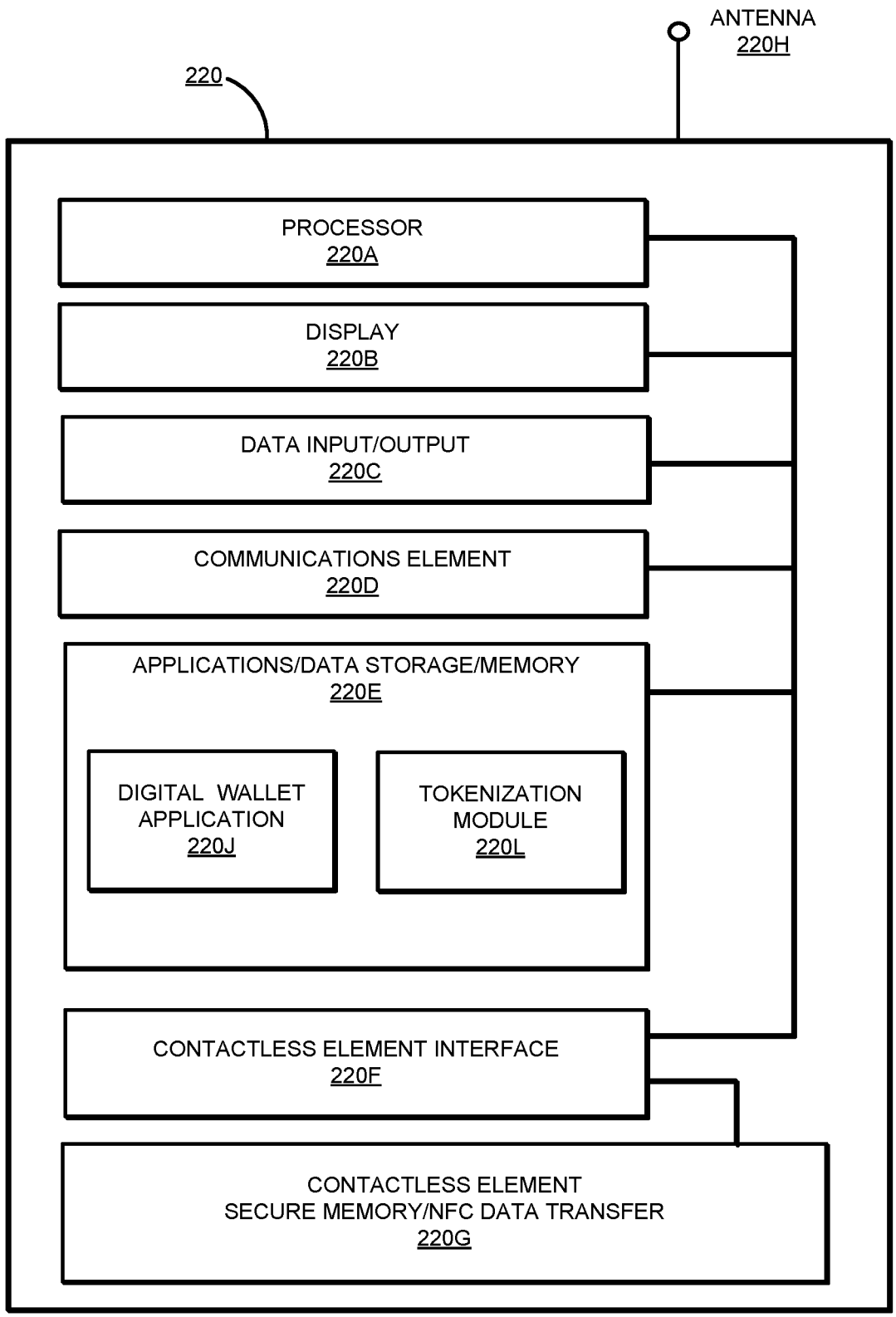
FIG. 2 shows a block diagram of an exemplary second user device according to an embodiment of the invention.

An example of a second user device 220, according to some embodiments of the invention, is shown in FIG. 2. Second user device 220 may include a mobile device. Second user device 220 may include circuitry that is used to enable certain device functions, such as telephony. The functional elements responsible for enabling those functions may include a processor 220A that can execute instructions that implement the functions and operations of the device. Processor 220A may access memory 220E (or another suitable data storage region or element) to retrieve instructions or data used in executing the instructions, such as provisioning scripts and mobile applications. Data input/output elements 220C, such as a keyboard or touchscreen, may be used to enable a user to operate the second user device 220 and input data (e.g., confirmation of binding process or further authentication information). Data input/output elements may also be configured to output data (via a speaker, for example). Display 220B may also be used to output data to a user. Communications element 220D may be used to enable data transfer between second user device 220 and a wired or wireless network (via antenna 220H, for example) to assist in connectivity to the Internet or other network, and enabling data transfer functions (such as binding of the account to the second user device 220 or provisioning of a token). Second user device 220 may also include contactless element interface 220F to enable data transfer between contactless element 220G and other elements of the device, where contactless element 220G may include a secure memory and a near field communications data transfer element (or another form of short range communications technology). As noted, a cellular phone, mobile device, or similar device is an example of a second user device device 720 that may be used in accordance with embodiments of the present invention. However, other forms or types of devices may be used without departing from the underlying concepts of the invention. For example, the second user device 220 may alternatively be in the form of a payment card, a key fob, a tablet computer, a wearable device, etc.

The memory 220E may comprise a digital wallet application 220J, a tokenization module 220L, and any other suitable module or data. The second user device 220 may have any number of mobile applications installed or stored on the memory 220E and is not limited to that shown in FIG. 2. The memory 220E may also comprise code, executable by the processor 220A for implementing a methods described herein comprising connecting to an electronic telecommunications device using a wireless communications device, binding an account associated with a first user device to a digital wallet (220J) on second user device 220, and sending an indication that the binding has been completed to a server computer.

The digital wallet application 220J may provide a user interface for a user to provide input and initiate, facilitate, and manage transactions using the second user device 220. The digital wallet application 220J may be able to store and/or access a payment token and/or payment credentials upon being bound with an account associated with a first user device and user. The digital wallet application 220J may also store an issuer-specific key, or any other suitable encryption means. The digital wallet application 220J may be able to cause the second user device 220 to transmit the payment token and/or payment credentials in any suitable manner (e.g., NFC, QR code, etc.). In some embodiments, in order to increase security, payment tokens and/or payment credentials may not be stored at the second user device 220. Instead, the payment tokens and/or payment credentials can be temporarily retrieved from a remote server or cloud server when a transaction is being performed.

The digital wallet application 220J may be associated with and/or provided by a wallet provider computer, an issuer computer, an issuer-trusted third party, a transaction processing computer, a transport computer, a resource provider computer, or any other suitable entity. The digital wallet application 220J may also include any suitable mobile application that enables a user to utilize second user device 220 to gain entry or access to an event, a secure area, or to secure data.

The tokenization module 220L may be a module of the digital wallet application 220J or a separate application on the second user device 220. The tokenization module 220L may comprise code that causes the processor 220A to obtain payment tokens. For example, the tokenization module 220L may contain logic that causes the processor 220A to request a token from a wallet provider computer or any other suitable tokenization service provider (e.g., an issuer computer, a transaction processing computer, or a processing network 105). In some embodiments, the second user device 220 may be able to communicate over-the-air with the processing network 105, and thus the tokenization module 220L may be programmed to cause the device 220 to send a direct request to the processing network 105 or electronic telecommunications device 104. In some embodiments, the tokenization module 220L may be programmed to cause the device 220 to send a token request message to either the electronic telecommunications device 104 or processing network 105 via communication channels typically used for authorization messages. For example, the tokenization module 220L may be programmed to cause the second user device 220 to send a token request message to the electronic telecommunications device 104, and the request may be forwarded through the communications network 114 to the processing network 105 in communication with token vault 106. In some embodiments, the tokenization module 220L may be provisioned with a token by processing network 105 and/or electronic telecommunications device 104 via the communications element 220. The provisioned token may be maintained by the tokenization module 220L and utilized by digital wallet application 220J for subsequent purchases by an associated user. In some embodiments, the provisioned token may be stored and accessed in memory 220E or secure memory 220G.

Figure 3:
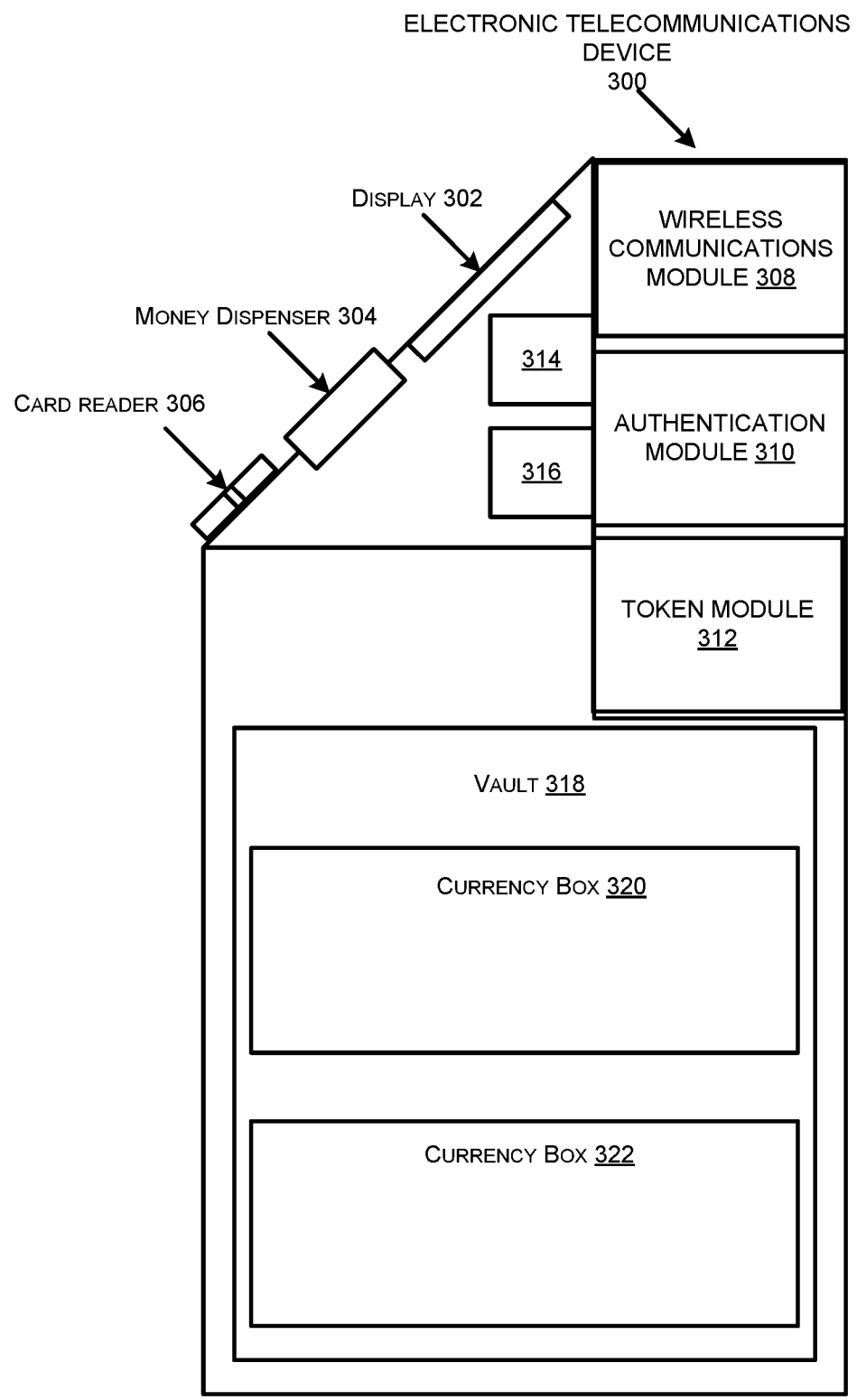
FIG. 3 shows a block diagram of an exemplary electronic telecommunications device according to an embodiment of the invention.

An example of an electronic communications device 300, according to some embodiments of the invention, is shown in FIG. 3. electronic communications device 300 may include an automatic machine teller (ATM). In some embodiments, the electronic communications device 300 may include a display 302, a money dispenser 304, and a card reader 306. The display 302 may be utilized by a user to provide authentication information (such as a PIN) during the binding process described herein. The card reader 306 may be used by the user to provide and for the electronic telecommunications device 300 to receive a first user device from a user. In some embodiments, the electronic communications device 300 may include a wireless communications module 308. The wireless communications module 308 may communicate and receive the first user device without the user having to interact with the card reader 306 (such as by utilizing Bluetooth or NFC).

In some embodiments, the wireless communications module 308 may communicate with a second user device to bind an account associated with a user to a digital wallet application on the second user device. In embodiments, the wireless communications module 308 may be configured to prompt a user, via the second user device, to confirm the binding process of an account associated with the first user device to the digital wallet of the second user device. The wireless communications module 308 may be configured to communicate with the processing network to authenticate the user utilizing the received authentication information and to obtain a token for further provisioning to the second user device. The wireless communications module 308 may provide an indication or message to a server computer or processing network that the binding process is complete. In embodiments, the electronic communications device 300 may include an authentication module 310 and token module 312. The authentication module 310 may be utilized to authenticate the user using the provided authentication information or by communicating with the processing network to authenticate the user. The authentication module 310 may prompt the user, utilizing display 302 for further authentication information or to inform the user that authentication has been validated or rejected.

In some embodiments, the token module 312 may be configured to provision a token to a second user device associated with a user subsequent to the binding of the account of a user to the second user device. The token may be utilized by the user, using the second user device, for streamlining purchases and payment transactions. In some embodiments, the token module 312 and wireless communications module 308 may communicate with a token vault that maintains a mapping of account information and tokens for use by the second user device. The functional elements responsible for enabling functions of the electronic communications device 300 may include a processor 314 that can execute instructions that implement the functions and operations of the device. Processor 314 may access memory 316 (or another suitable data storage region or element) to retrieve instructions or data used in executing the instructions, such as provisioning scripts and mobile applications for binding an account of a user to a second user device.

In some embodiments, the electronic telecommunications device 300 may include a vault 318 and one or more currency boxes 320 and 322. The vault 318 may include an enclosure for preventing tampering or accessing of currency stored in currency boxes 320 and 322. In embodiments, the electronic telecommunications device 300 may dispense money from the money dispenser 304 via the currency box 320. In embodiments, a user whose second user device has been bound to an account may withdraw money from the currency box 320 via the money dispenser 304. As described herein, the electronic telecommunications device 300 may implement a secure cryptoprocessor for implementing crpyotgraphic operations of sensitive information provided by and/or associated with a user. For example, processor 314 may be an example of a secure cryptoprocessor and may encrypt sensitive information provided by the user (such as a PIN or other authentication information provided during an authentication process). Further, the electronic telecommunications device 300 may include a number of alarms, housing, and tamper resistance mechanisms that prevent physical access to device 300, vault 318, or currency boxes 320 and 322. Further, the processor 314, memory 316, and modules 308-312 may be embedded or housed in multiple physical security layers (housing) to prevent tampering and or access.

Figure 4:
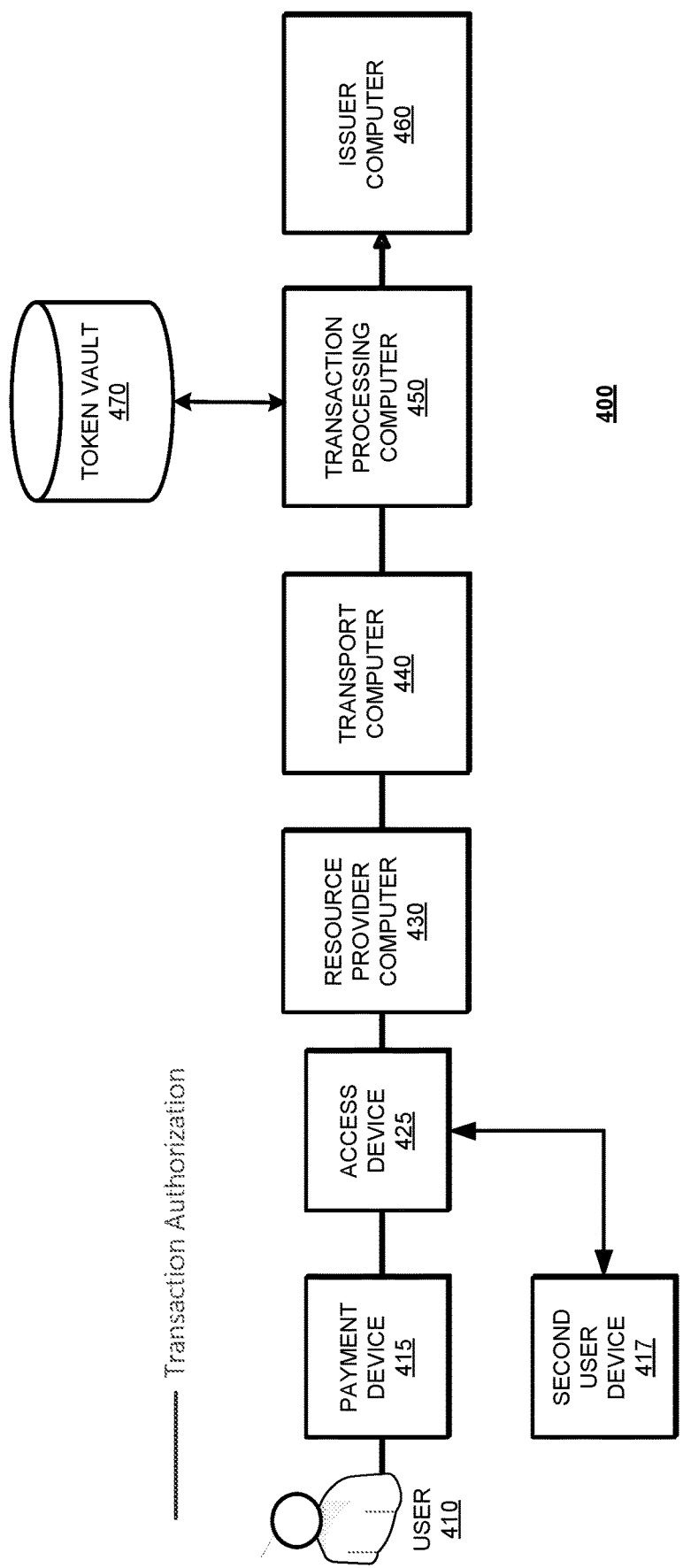
FIG. 4 shows a block diagram of a system for authenticating transactions, according to embodiments of the present invention.
Figure 5:
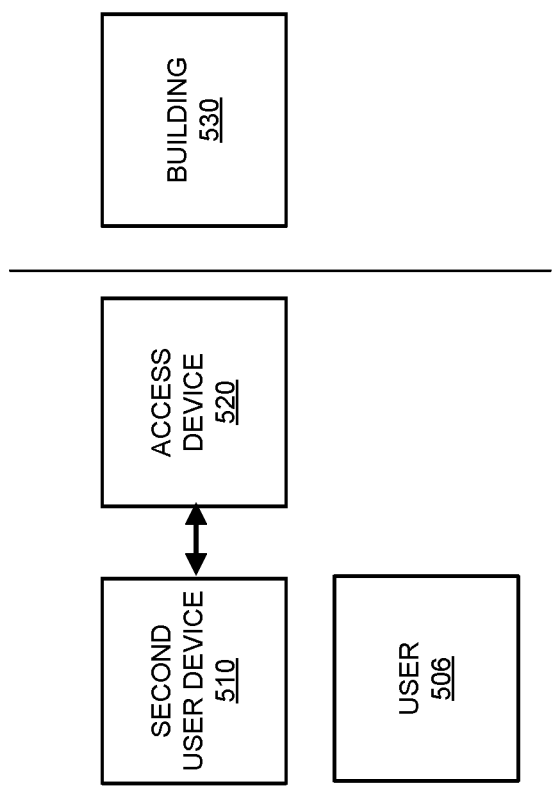
FIG. 5 shows a block diagram of a building access system.

FIG. 4 shows a system 400 comprising a number of components. The system 400 comprises a first user device such as a payment device 415 and a second user device 417 which may be associated with a user 410 and may be able to provide the previously provisioned payment credentials to an access device 425. The access device 425 may be associated and in communication with a resource provider computer 430. The access device 425 can interact with the payment device 415 or the second user device 417 to conduct a payment transaction. For example, the user 410 may utilize the second user device 415 to interact with the access device 425 that is associated with a resource provider computer 430 that further operates a payment account, debit/credit card service, or secure access service. Further, the resource provider computer 430, a transport computer 440, a transaction processing computer 450, and an issuer computer 460 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user 410 may use the second user device 417 to conduct transactions with a resource provider associated with the resource provider computer 430. The second user device 417 may store information associated with the user 410 and/or a payment account. For example, the second user device 417 may store payment credentials as well as personal information such as a name, address, email address, phone number, or any other suitable user 410 identification information. The second user device 417 may provide this information to the access device 425 during a transaction.

The resource provider computer 430 may be associated with a resource provider. The resource provider may engage in transactions, sell goods or services, or provide access to goods or services to the user 410 such as cash deposit/withdrawal, secure access, secure data access, etc. The resource provider may accept multiple forms of payment (e.g. the payment device 415) and may use multiple tools to conduct different types of transactions. The resource provider may also sell goods and/or services via a website, and may accept payments over the Internet. In embodiments, the user 410 may require authorization before a transaction can be completed. The resource provider computer 430 may implement the authorization of user 410 or may communicate with one or more other computers such as issuer computer 460 to authorize the user.

Authorization requests submitted by the resource provider computer 430 or the access device 425 may be sent to the transport computer 440 (which may be an acquirer computer), which may be sent to the issuer computer 460 via the transaction processing computer 450. The transport computer 440 may be associated with the resource provider computer 430, and may manage authorization requests on behalf of the resource provider computer 430.

As shown in FIG. 4, the transaction processing computer 450 may be disposed between the transport computer 440 and the issuer computer 460. The transaction processing computer 450 may include data processing subsystems, networks, and operations used to support and deliver authorization services, exception file services, and clearing and settlement services. For example, the transaction processing computer 450 may comprise a server coupled to a network interface (e.g., by an external communication interface), and databases of information. The transaction processing computer 450 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 450 may use any suitable wired or wireless network, including the Internet. The transaction processing computer 450 may be in communication with a token vault 470 as described herein.

The issuer computer 460 may issue and manage a payment account and an associated payment device 415 and the second user device of the user 410. The issuer computer 460 may be able authorize transactions that involve the payment account. Before authorizing a transaction, the issuer computer 460 may authenticate payment credentials received in the authorization request, and check that there is available credit or funds in an associated payment account. The issuer computer 460 may also receive and/or determine a risk level associated with the transaction, and may weigh the risk when deciding whether or not to authorize the transaction. If the issuer computer 460 receives an authorization request that includes a payment token, the issuer computer 460 may be able to de-tokenize the payment token in order to obtain the associated payment credentials.

After the issuer computer 460 determines whether or not the transaction is authorized, an authorization response message may be transmitted by the issuer computer 460 back to the access device 425. A clearing and settlement process can occur at the end of the day or at any other suitable time period.

Once the second user device 103 is provisioned with access data, it may be used to conduct an access transaction. FIG. 8 illustrates a system including a second user device 510 (which may be a mobile device) that is provisioned with access data and that can allow a user to access a location such as a building.

FIG. 8 shows a block diagram of a building access system. FIG. 8 shows a second user device 510 operated by a user 506. The second user device 510 has been provisioned with access data as described above. The second user device 510 can interact with the access device 520 and pass access data to the access device 520. The access device 520 may locally verify the received access data or it may communicate with a remotely located authentication server computer (not shown). The remotely located authentication server computer may verify that the access data is authentic and may transmit a signal indicating this back to the access device 520. The access device 520 may then proceed to let the user 506 enter the building 530.

As described herein, a computer system may be used to implement any of the entities or components described above. The subsystems of a computer system may be interconnected via a system bus. Additional subsystems such as a printer, keyboard, fixed disk (or other memory comprising computer readable media), monitor, which is coupled to display adapter, and others are also included in embodiments described herein. Peripherals and input/output (I/O) devices, which may be coupled to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk of the computer system may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
receiving, by an automated teller machine, authentication information from a user in response to a first user device being inserted into the automated teller machine, the authentication information associated with an account of the user;
connecting, by the automated teller machine using a wireless communications device, to a second user device associated with the user by establishing a secure communication channel between the automated teller machine and the second user device, the secure communication channel including a secure sockets layer (SSL) session with a session key and established via mutual authentication between the automated teller machine and the second user device;
binding, by the automated teller machine, the account associated with the first user device to a digital wallet on the second user device in response to receiving a confirmation from the second user device, the second user device configured to receive input from the user corresponding to the confirmation of the binding between the first user device and the second user device based at least in part on the connecting between the automated teller machine and the second user device;
provisioning, by the automated teller machine and to the digital wallet of the second user device, a token in response to binding the account associated with the first user device to the digital wallet on the second user device;
transmitting, by the automated teller machine and to a server computer, instructions to update a mapping of the token to the account of the user in response to provisioning the token to the digital wallet on the second user device; and
sending, by the automated teller machine, an indication that the binding has been completed to the server computer.

2. The method of claim 1, wherein the first user device is a card, the second user device is a mobile device, and the server computer is a payment processor.

3. The method of claim 2, wherein the payment processor is in communication with a token vault.

4. The method of claim 3, wherein the payment processor issues the token to the second user device after the binding has been completed.

5. The method of claim 3, wherein the token vault maintains a mapping of tokens to accounts for one or more users.

6. The method of claim 1, wherein the first user device and the second user device are bound by an account number or the token associated with the account number of the account.

7. The method of claim 1, wherein the indication indicates that the binding was conducted using the automated teller machine.

8. The method of claim 1, wherein connecting to the second user device associated with the user is based on authenticating the user utilizing the authentication information.

9. The method of claim 1, wherein receiving, by the automated teller machine, the first user device occurs using one or more of a magnetic card strip reader, Bluetooth, or Near Field Communication.

10. An automated teller machine comprising:
a processor;
a wireless communication device coupled to the processor; and
a memory element including instructions that, when executed with the processor, cause the automated teller machine to, at least:
receive authentication information from a user in response to a first user device being inserted into the automated teller machine, the authentication information associated with an account of the user;
connect, via the wireless communication device, to a second user device by establishing a secure communication channel between the automated teller machine and the second user device, the secure communication channel including a secure sockets layer (SSL) session with a session key and established via mutual authentication between the automated teller machine and the second user device;
bind the account associated with the first user device to a digital wallet on the second user device in response to receiving a confirmation from the second user device, the second user device configured to receive input from the user corresponding to the confirmation of the binding between the first user device and the second user device based at least in part on the connecting between the automated teller machine and the second user device;
provision to the digital wallet of the second user device a token in response to binding the account associated with the first user device to the digital wallet on the second user device;
transmit, to a server computer, instructions to update a mapping of the token to the account of the user in response to provisioning the token to the digital wallet on the second user device; and
send information identifying that the binding has been completed to the server computer.

11. A non-transitory computer-readable storage medium storing computer-executable instructions that, when executed by a computer system, configure the computer system to perform operations comprising:
receiving authentication information from a user in response to a first user device being inserted into an automated teller machine, the authentication information associated with an account of the user;
connecting, using a wireless communications device, to a second user device associated with the user by establishing a secure communication channel between the automated teller machine and the second user device, the secure communication channel including a secure sockets layer (SSL) session with a session key and established via mutual authentication between the automated teller machine and the second user device;

binding the account associated with the first user device to a digital wallet on the second user device in response to receiving a confirmation from the second user device, the second user device configured to receive input from the user corresponding to the confirmation of the binding between the first user device and the second user device based at least in part on the connecting between the automated teller machine and the second user device;

provisioning to the digital wallet of the second user device a token in response to binding the account associated with the first user device to the digital wallet on the second user device;

transmitting, to a server computer, instructions to update a mapping of the token to the account of the user in response to provisioning the token to the digital wallet on the second user device; and sending an indication that the binding has been completed to the server computer.

12. The non-transitory computer-readable storage medium of claim 11, wherein the first user device is a payment card, the second user device is a mobile device, and the server computer is a payment processor.

13. The non-transitory computer-readable storage medium of claim 12, wherein the payment processor is in communication with a token vault.

14. The non-transitory computer-readable storage medium of claim 13, wherein the payment processor issues the token to the second user device after the binding has been completed.

15. The non-transitory computer-readable storage medium of claim 13, wherein the token vault maintains a mapping of tokens to accounts for one or more users.

16. The non-transitory computer-readable storage medium of claim 11, wherein the first user device and the second user device are bound by an account number or the token associated with the account number of the account.

17. The non-transitory computer-readable storage medium of claim 11, wherein the indication indicates that the binding was conducted using the automated teller machine.

* * * * *